April 14, 1959 — F. F. JOHNSON — 2,882,417

WELL LOGGING METHOD AND APPARATUS

Filed Aug. 10, 1953

INVENTOR.
FRANK FAWCETT JOHNSON
BY
*Campbell Brumbaugh, Free & Graves*
HIS ATTORNEYS.

United States Patent Office 2,882,417
Patented Apr. 14, 1959

2,882,417
WELL LOGGING METHOD AND APPARATUS

Frank Fawcett Johnson, Danbury, Conn., assignor, by mesne assignments, to Schlumberger Well Surveying Corporation, Houston, Tex., a corporation of Texas Application August 10, 1953, Serial No. 373,216

9 Claims. (Cl. 250—83.6)

This invention relates to well logging techniques and, more particularly, pertains to novel and improved radioactivity logging methods and apparatuses for obtaining a log of the radiant energy emanating under induced conditions from the earth formations traversed by a well or bore hole containing a hydrogenous fluid.

As used herein, the term "radiant energy" is intended to denote either wave or particle energy. Accordingly, gamma rays, neutrons and charged particles are all deemed to be within the scope of the expression "radiant energy."

Moreover, "induced radiant energy" is intended to signify the radiant energy emanating from a material in response to incident radiant energy. Such phenomena as the generation of gamma rays by the material as a result of bombardment by and the capture of incident neutrons, and the production of slowed or lower energy neutrons caused by the elastic collisions of incident neutrons with particles of the material are considered as exemplary of "induced radiant energy."

One variety of radioactivity well logging apparatus presently in use includes a source for irradiating the earth formations with neutrons some of which are slowed and captured, thereby inducing gamma radiation. By continuously recording a characteristic of this gamma radiation as the equipment traverses the bore hole, a useful log providing information regarding certain qualities, such as porosity, of the earth formations is obtained.

The above-described apparatus is generally satisfactory and has met with wide commercial acceptance. However, since in the usual applications, the bore hole is filled with a hydrogenous drilling fluid, such as a waterbase mud, and is not of uniform diameter throughout its depth, accurate quantitative data may not always be obtained. This is understandable in view of the fact that neutrons are slowed and effectively reduced in number in traveling through a hydrogenous compound to an extent dependent upon the density and volume of the compound.

It is, therefore, an object of the present invention to provide novel and improved well logging methods and apparatuses of the radioactivity type by means of which more accurate quantitative data concerning the earth formations may be obtained than has been heretofore possible.

Another object of the present invention is to provide novel and improved radioactivity logging methods and apparatuses for inducing and detecting radiant energy in the earth formations traversed by a bore hole and in which the effects of variations in the drilling fluid content caused by nonuniformity in the bore hole diameter are minimized.

Logging apparatus embodying the present invention is adapted to derive a log of formations traversed by a bore hole of nonuniform diameter and containing a hydrogenous fluid. The apparatus comprises a source of radiant energy for irradiating the formations and causing the emission of induced radiant energy. A radiant energy detector, spaced from the source in an axial direction relatively to the bore hole, intercepts induced radiant energy and provides a corresponding electrical signal which is utilized to obtain a log of the formations. In order to minimize the effects of variation in the volume of fluid interposed between the bore hole equipment and the sidewall of the bore hole due to the nonuniformity of the bore hole diameter, the spacing between the source and the detector is adjusted in a prescribed manner dependent upon the diameter of the bore hole.

The invention may best be understood by reference to the following detailed description taken in conjunction with the accompanying figures of the drawing, in which.

Figure 1:
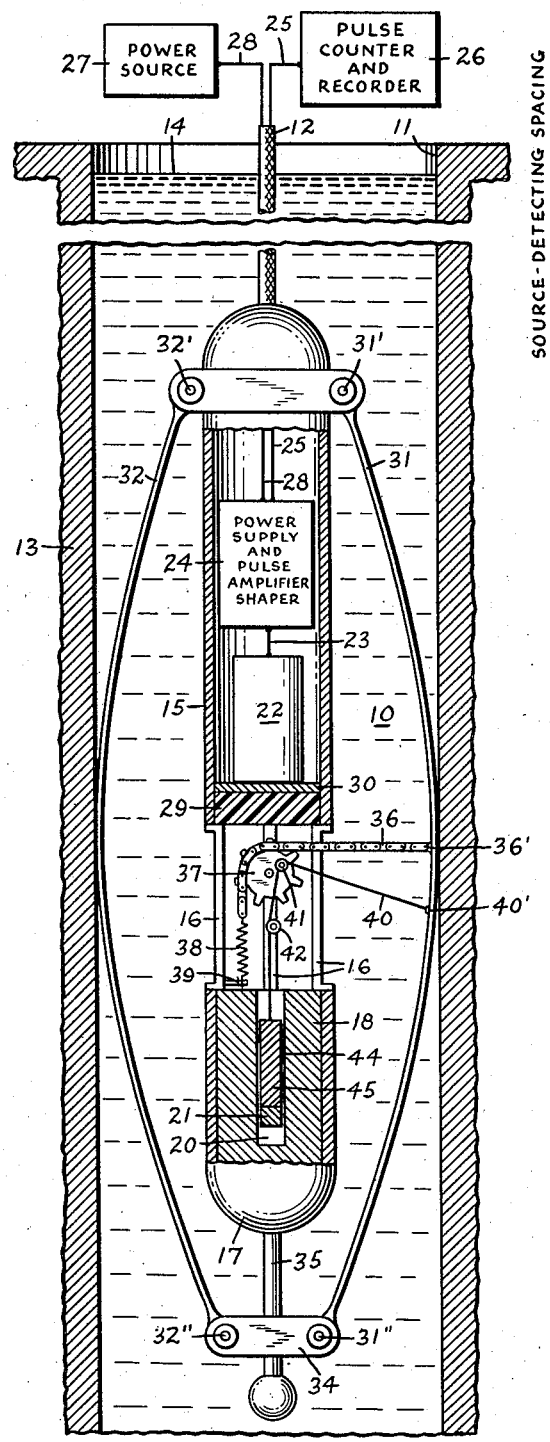
Fig. 1 is a schematic representation, partly in vertical section, of radioactivity logging apparatus constructed in accordance with the invention and shown in operative condition in a bore hole.

In Fig. 1, there is shown radioactivity well logging apparatus including a prospecting device or sonde 10 supported in a bore hole 11 by a cable 12, which may be used in cooperation with a conventional motor driven winch (not shown) to lower and raise the sonde 10 in the usual manner. The bore hole 11 traverses the earth formations 13 and may contain a hydrogenous fluid 14, such as waterbase drilling mud.

The sonde 10 may comprise a pressure-tight housing 15 attached to the cable 12 at its upper end and having a plurality of rod-like supports 16 extending from the lower end thereof. The supports 16 may terminate at a base 17 in which a gamma ray shield 18 may be mounted. The shield 18 may be composed of lead and may be provided with a well or central bore 20, in which a conventional source of radiant energy 21 may be disposed. The source 21 may, for example, comprise a mixture of radium and beryllium, and may function in a well-known manner to irradiate the formations 13 with neutrons.

A radiant energy detector 22 may be disposed within the housing 15. The detector 22 may, for example, be a conventional Geiger-Müller tube, which responds in a well-known manner to radiant energy, such as gamma rays, and and produces a corresponding electrical signal of pulse wave form.

The electrical signal output of the radiant energy detector 22 may be applied through a conductor 23 to an electronic unit 24, wherein the signal pulses from the detector 22 may be amplified and shaped. The electronic unit 24 may be contained within the housing 15. The output of the electronic unit 24 may be connected through an electrically insulated cable conductor 25 to a conventional pulse counter and recorder unit 26, which may be located at the surface of the earth.

The various electronic circuits of the unit 24 may be of conventional construction, and derive their power from a power source 27 at the surface of the earth which supplies electrical current over an electrically insulated cable conductor 28 of the cable 12 to a power supply portion of the electronic unit 24. The power supply portion of the electronic unit 24 may function in a well-known manner to produce the required unidirectional voltages for the pulse amplifying and shaping portion of the unit 24 as well as the necessary high voltages for operating the Geiger-Müller tube 22.

A neutron shield may be used to close the lower end of the pressure tight housing 15. This shield may comprise a layer 29 of hydrogeneous material, such as paraffin, topped by a layer 30 of lead, cadmium or boron carbide.

The control mechanism for adjusting the distance between the source 21 and the detector 22 in an axial direction relatively to the bore hole 11, in a prescribed manner dependent upon the diameter of the bore hole, may comprise a pair of outwardly bowed spring members 31 and 32. The bowed spring members 31 and 32 may be pivotally connected to the upper end of the housing 15 at points 31' and 32', respectively, and may extend generally along the body of the sonde 10 to lower pivot points 31" and 32", respectively, on a collar 34 that may be slidably supported by a rod 35 extending from the base 17. The spring members 31 and 32 may be biased outwardly relative to the central body portion 15 of the sonde 10 and thus may be maintained in biased engagement with the sidewall of the bore hole 11.

A driving chain 36 may be fixed at one of its extremities to a central point 36' on the bowed spring member 31 and may extend essentially horizontally into meshing engagement with the teeth of a toothed wheel or gear 37, which may be rotatably supported within the space defined by the supports 16. From the wheel 37, the chain 36 may extend in a downward direction and may be connected to one end of a tension spring 38, the other end of which may be secured to a terminal 39 positioned in the vicinity of the upper extremity of the shield 18.

The control mechanism for adjusting the distance between the source 21 and the detector 22 may further include a cable 40 connected at one of its extremities to a point 40' on the spring member 31. The point 40' may preferably be situated at a position somewhat below the point 36'. The cable 40 may pass over a grooved pulley 41, rotatably supported at an eccentric point on the gear 37, and over a grooved pulley 42, rotatably supported by one of the rod-like supports 16 at a point positioned below the gear 37. The cable 40 may terminate at a hollow plunger 44 slidably received by the bore 20. The plunger 44 may be filled with a gamma ray shield material 45, for instance, lead, and its lower end may be affixed to the source 21.

As pointed out earlier, a bore hole generally does not have a uniform diameter throughout its depth. Consequently, the volume of hydrogenous fluid, water in this case, interposed between the source 21 and the sidewall of the bore hole 11 varies as the sonde 10 traverses the bore hole. Since neutrons from the source 21 are slowed and effectively reduced in number in relation to the amount of hydrogenous fluid present, the indications produced at the pulse counter and recorder unit 26 may be undesirably dependent upon the bore hole diameter.

In accordance with the invention, when the sonde 10 is lowered through the bore hole 11, the source of radiant energy 21 emits radiations, such as neutrons, to irradiate the formations 13. Some of the neutrons incident upon the formations 13 are slowed to energy levels at which they may be captured. In response to each such capture, a quantum of gamma radiation is emitted. This induced radiant energy is returned, at least in part, to the sonde 10 and impinges upon the radiant energy detector 22, which produces a corresponding electrical signal of pulse wave form in response to the gamma rays.

This electrical signal is then applied to the electronic unit 24, wherein the pulses are amplified and shaped before being transmitted over the conductor 25 to the pulse counter and recorder unit 26. The pulse counter derives a potential representing the number of pulses occurring per unit time for controlling the recorder. Thus, a continuous log of the earth formations traversed by the bore hole 11 is obtained.

It is evident that as the sonde 10 traverses the bore hole 11 the spacing between the source 21 and the detector 22 varies with changes in the bore hole diameter, in a predetermined manner. This relationship is dependent upon the distance between the points 36' and 40' on the spring member 31, the diameters of the gear 37 and the pulley 41, and the distance between their rotational axes.

Figure 2:
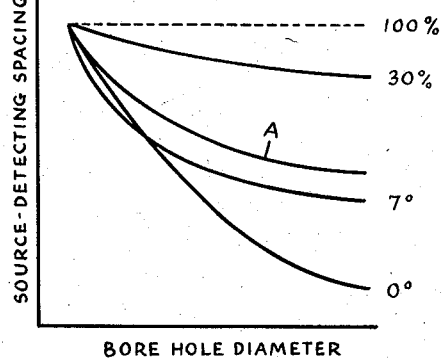
Fig. 2 is a graph including a series of curves useful in determining an operating characteristic for the apparatus shown in Fig. 1.

The manner in which these parameters are selected may be best appreciated by reference to Fig. 2 which is a graph of bore hole diameter versus source-detector spacing. On this graph are plotted various curves, each illustrating the source detector spacing required to maintain a given counting rate for a particular formation porosity, irrespective of bore hole diameter. It is evident from the curves designated 0%, 7%, 30%, and 100% porosity that the source detector spacing should vary with bore hole diameter in a different manner for the various porosities. Since formation porosity is an unknown quantity derived through the use of the logging apparatus itself, compensation may be obtained for only a limited porosity range. Curve A is a proposed function affording such a compromise in an approximate range of porosities from 5 to 20% and the parameters of the linkage in the control mechanism are designed accordingly.

Of course, the linkage may be suitably varied to meet other porosity ranges, as may be required. For example, the spacing between the points 36' and 40' on the spring member 31 may be adjustable and/or the distance between the rotational axes of the gear 37 and pulley 41 may be adjustable so as to permit a variety of proposed functions, other than the function represented by curve A.

From an inspection of the linkage system in Fig. 1, it is evident that the spacing between the source 21 and the detector 22 decreases as the bore hole diameter increases. Moreover, the rate of change of spacing is relatively large for variations in bore hole diameters of small value, and this rate decreases as the bore hole diameter increases, thereby substantially satisfying the requirements of the proposed function A of Fig. 2.

Figure 3:
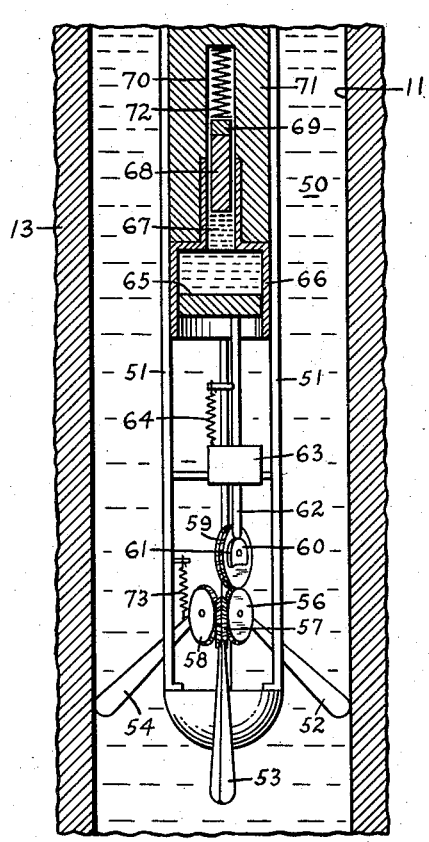
Fig. 3 is a schematic representation, partly in vertical section, of a modification of the apparatus illustrated in Fig. 1, in accordance with the invention.

In the modified sonde 50 shown in Fig. 3, only the lower portion comprising the support rods 51 is illustrated, it being understood that an upper portion may be provided with a housing similar to the one designated 15 in Fig. 1. Three feeler arms 52, 53 and 54 may extend radially from the axis of the sonde 50. They may be individually supported for pivotal movement in respective vertical planes at points within the structure of the support rods 51 and their free end may engage the sidewall of the bore hole 11. Thus, the arms 52, 53 and 54 may be fixedly mounted on the doubly-beveled gears 56, 57 and 58, respectively, which may be in meshing engagement with one another, and which may be rotatably mounted in suitable bearings formed in the apparatus. In this manner, the arms may be ganged for simultaneous movement. Means, such as a helical spring 73, may be provided for biasing the arms in an upward direction into engagement with the sidewall of the bore hole 11.

In order to facilitate insertion of the apparatus in a well, the arms 52, 53 and 54 may be maintained close to the sonde 10 by any suitable means such as a band. When the sonde 10 has been positioned at the desired depth in the bore hole 11, the band can be broken or destroyed by means such as an explosive device actuated from the surface of the earth. Means of this type are known and need not be described in detail herein.

One of the gears 56 may drive a pinion 59 which, in turn, may drive a cam 60 provided with a specially contoured cam surface 61. A follower 62 may engage the cam surface 61 and may be supported for reciprocating movement in a bearing means 63. A spring 64 may be connected between the follower 62 and the bearing 63 to bias the follower 62 against the cam surface 61.

The upper extremity of the follower 62 may be connected to a piston 65 supported for vertical movement within a cylinder 66, having a given diameter. The upper end of the cylinder 66 may be closed except for a transition connection with another cylinder 67 having a smaller diameter and provided with a piston 68. The cylinders 66 and 67 may be filled with a relatively incompressible fluid, such as water, so that the longitudinal movement of the piston 65 produces a similar movement of the piston 68.

The piston 68 may be comprised of, or provided with an inner core of, a gamma-ray shield material, and its upper end may be connected to a source of neutrons, such as a radium beryllium pellet 69. The source 69 and the upper extremity of the piston may be supported for sliding movement in a bore 70 centrally located within a lead shield 71. A helical spring 72 may extend between the source 69 and the upper extremity of the bore 70 and serve to maintain the pistons 65 and 68 in fluid coupling relation.

It is evident that as the sonde 50 traverses the bore hole 11, variations in the bore hole diameter cause pivotal movement of the arms 52, 53, and 54 and correspondingly position the cam 60, which causes movement of the piston 65. The movement of the piston 65 is accompanied by a greater or amplified displacement of the piston 68. The amount of this amplification is dependent upon the relative diameters of the pistons, as is well known. By suitably designing the surface 61 of the cam 60, and the amount of amplification provided by the system of pistons and cylinders, movement transferred from the feeler arms 52—54 to the source 69 may be controlled exactly in accordance with any prescribed function. For the cam configuration shown, the distance between the source 69 and the detector (Geiger-Müller tube 21 of Fig. 1) varies with changes in bore hole diameter in accordance with a function, such as curve A of Fig. 2.

Although the invention has been shown in association with neutron-gamma-ray well logging apparatus, it may be suitably applied to other systems. For example, the source may provide neutrons, but the detector may be responsive to neutrons which are slowed to predetermined energy levels by the formations. For this type of apparatus, the source detector spacing may vary with bore hole diameter in accordance with a curve such as the one designated A in Fig. 2 for the above-described neutron-gamma-ray well logging apparatus.

Alternatively, in systems wherein a source of gamma rays is provided for irradiating earth formations and the resulting gamma radiation is detected, and where the derived counting rate varies in an adverse manner with variations in bore hole diameter, a system similar to that described either in connection with Fig. 1 or 3 may be employed. However, in such an application, it may be advisable to increase the spacing between the source and the detector as the bore hole diameter increases.

Thus, there is provided in accordance with the present invention novel methods and apparatuses which minimize the effects of variations in drilling fluid content caused by nonuniformity in bore hole diameter. Accordingly, more accurate quantitative data concerning the earth formations may be obtained than has been heretofore possible.

It will be understood that the above-described embodiments are merely exemplary and that they are susceptible of modification and variation without departing from the spirit and scope of the invention. For example, instead of moving the source of radiant energy to vary the source detector spacing, the detector itself may be displaced according to the prescribed function.

Although the elements of the control mechanism shown in either of Figs. 1 and 3 have been illustrated as being exposed to the drilling mud, obviously they may be enclosed within a pressure-tight housing. For example, in Fig. 1, the wall of such a housing may enclose the rods 16 and may be provided with openings for admitting a portion of the chain 36, in which a small cable section may be inserted, and the cable 35. The openings may be suitably packed to minimize the entry of fluid into the housing.

In the apparatus of Fig. 3, a pressure housing may enclose the supports 51 and each of the gears 56, 57 and 58 may be coupled to one of three shafts that may extend through individual, suitably packed openings in the housing. The arms 52, 53 and 54 may then be coupled to these shafts externally of the housing.

Therefore, the invention is not deemed to be limited except as defined in the appended claims.

I claim:

1. Well logging apparatus, comprising an elongated carrier adapted to be lowered through a bore hole having fluid therein, a primary source of radiant energy for irradiating the bore hole wall and causing the emission of induced radiant energy therefrom, at least some of said induced radiant energy being susceptible of modification by said bore hole fluid, a radiant energy detector for detecting said induced radiant energy at least some of which passes through said bore hole fluid, said primary source and said detector being separated by said elongated carrier in spaced-apart relation in an axial direction relatively to the bore hole, means urged into engagement with the wall of the bore hole for displacing a member as a function of the size of the bore hole, and means responsive to displacement of said member for varying the relative spacing between said primary source and said detector as an inverse function of the size of the bore hole.

2. Well logging apparatus, comprising an elongated carrier adapted to be lowered through a bore hole having fluid therein; said carrier supporting in longitudinally spaced-apart relation relatively to the axis of said carrier a source of radiant energy for irradiating earth formations traversed by the bore hole to cause emission of induced radiant energy therefrom, at least some of said induced radiant energy being susceptible of modification by said bore hole fluid, and a radiant energy detector for detecting said induced radiant energy at least some of which passes through said bore hole fluid, a plurality of outwardly bowed spring members mounted on said carrier, each of said plurality of outwardly bowed spring members being biased so that a central portion thereof is adapted to contact the wall of said bore hole, and means responsive to the transverse displacement of said central portion of at least one of said bowed spring members from the longitudinal axis of said carrier to inversely vary the relative spacing between said source of radiant energy and said radiant energy detector.

3. In radioactivity well logging apparatus having at least two members including a source of radiant energy for irradiating the wall of a bore hole and causing the emission of induced radiant energy therefrom, at least some of said induced radiant energy being susceptible of modification by fluid within the bore hole, and a radiant energy detecting means for detecting said induced radiant energy adapted to be lowered through a bore hole having fluid therein, at least some of said induced radiant energy being susceptible of modification by said bore hole fluid, the combination of an elongated carrier for supporting said two members in a longitudinally spaced relation relatively to the axis of said carrier, a plurality of outwardly bowed spring members mounted on said carrier, each of said bowed spring members having at least one end thereof slidably mounted on said carrier for axial movement therewith and having a portion thereof adapted to contact the wall of the bore hole, rotatable control means mounted on said carrier, and means responsive to the transverse movement of one of said spring member portions for rotating said control means to vary the longitudinal displacement of said two longitudinally displaced members as an inverse function of the bore hole diameter.

4. In radioactivity well logging apparatus having at least two members including a source of radiant energy for irradiating the wall of a bore hole and causing the emission of induced radiant energy therefrom and a radiant energy detecting means for detecting said induced radiant energy longitudinally displaced with relation to the axis of the bore hole having fluid therein and adapted to be lowered through the bore hole, at least some of said induced radiation being susceptible of modification by said bore hole fluid, the combination of an elongated carrier for supporting said two members, a plurality of outwardly bowed spring members mounted on said carrier, each of said bowed spring members having at least one end thereof slidably mounted on said carrier for axial movement therewith and having a portion thereof adapted to contact the wall of the bore hole, rotatable control means mounted on said carrier, means responsive to the transverse displacement from the axis of said carrier of the wall contacting portion of one of said spring members for rotating said control means, cable means connecting a point on said one bowed spring member and one of said two longitudinally displaced members, and a pulley eccentrically mounted on said rotatable control means, said cable being adapted to pass over said pulley so as to vary the longitudinal displacement of said two displaced members as an inverse function of the bore hole diameter.

5. In radioactivity well logging apparatus having at least two spaced apart members including a source of radiant energy for irradiating the wall of a bore hole and causing the emission of induced radiant energy therefrom and a radiant energy detecting means for detecting said induced radiant energy adapted to be lowered through a bore hole having fluid therein, at least some of said induced radiant energy being susceptible of modification by said bore hole fluid, the combination of an elongated carrier for supporting said two spaced apart members in longitudinal relation relative to the axis of said carrier, a plurality of outwardly bowed spring members mounted on said carrier, each of said bowed spring members having at least one end thereof slidably mounted on said carrier for axial movement therewith and having a portion thereof adapted to contact the wall of the bore hole, means mounting one of said spaced apart members for axial movement relatively to said carrier, rotatable control means mounted on said carrier, means responsive to the transverse displacement of the wall contacting portion of one of said bowed spring members for rotating said control means, a pulley eccentrically mounted on said rotatable control means, and cable means passing over said eccentrically mounted pulley and connecting said one spaced apart member and a point on said bowed spring member positioned so that the transverse displacement of said bowed spring members from said axis of said carrier controls the axial displacement of said two spaced apart members, as an inverse function of the bore hole diameter.

6. In radioactivity well logging apparatus having at least two spaced apart members including a source of radiant energy for irradiating the wall of a bore hole and causing the emission of induced radiant energy therefrom and a radiant energy detecting means for detecting said induced radiant energy adapted to be lowered through a bore hole having fluid therein, at least some of said induced radiant energy being susceptible of modification by said bore hole fluid, the combination of an elongated carrier for supporting said two spaced apart members in a longitudinally spaced apart relation relatively to the axis of said carrier, at least one of said spaced apart members being mounted for axial movement relatively to the axis of said carrier, and hydraulic means responsive to variation in bore hole diameter for varying the axial spacing of said two spaced apart members as an inverse function of the bore hole diameter.

7. In radioactivity well logging apparatus having at least two spaced apart members including a source of radiant energy for irradiating the wall of a bore hole and causing the emission of induced radiant energy therefrom and a radiant energy detecting means for detecting said induced radiant energy adapted to be lowered through a bore hole having fluid therein, at least some of said induced radiant energy being susceptible of modification by said bore hole fluid, the combination of a carrier for supporting said two spaced apart members in longitudinally spaced apart relation relatively to the axis of said carrier, at least one of said two spaced apart members being mounted for axial movement relatively to the axis of said carrier, hydraulic piston means for controlling the movement of one of said two spaced apart members, cam means mounted within said carrier for controlling said hydraulic piston means, and means responsive to variation in bore hole diameter for operating said cam means so that the axial displacement between said two spaced apart members is an inverse function of the bore hole diameter.

8. Radioactivity well logging apparatus for use in a bore hole of nonuniform diameter containing a hydrogenous fluid, comprising a source of radiant energy adapted to be lowered through the bore hole for irradiating the bore hole wall and causing the emission of induced radiant energy therefrom, at least some of said induced radiant energy being susceptible of modification by said hydrogenous fluid, a radiant energy detector for detecting said induced radiant energy at least some of which passes through said hydrogenous fluid, said detector being spaced from said source in an axial direction relatively to the bore hole and adapted to be moved with said source, and means for varying the relative spacing between said source and said detector as an inverse function of the bore hole diameter to correct for variations in the volume and density of hydrogenous fluid in the bore hole adjacent said detector.

9. Radioactivity well logging apparatus for use in a bore hole of nonuniform diameter containing a hydrogenous fluid, comprising a source of radiant energy adapted to be lowered through the bore hole for irradiating the bore hole wall and causing the emission of induced radiant energy therefrom, at least some of said induced radiant energy being susceptible of modification by said hydrogenous fluid, a radiant energy detector for detecting said induced radiant energy at least some of which passes through said hydrogenous fluid, said detector being spaced from said source in an axial direction relatively to the bore hole and adapted to be moved with said source, means for shielding said radiant energy detector from direct radiations from said source, and means for varying the relative spacing between said source and said detector as an inverse function of the bore hole diameter to correct for variations in the volume and density of hydrogenous fluid in the bore hole adjacent said detector.

References Cited in the file of this patent

UNITED STATES PATENTS

| | | |
|---|---|---|
| 2,303,688 | Fearon | Dec. 1, 1942 |
| 2,648,778 | Silverman et al. | Aug. 11, 1953 |
| 2,725,486 | Walstrom | Nov. 29, 1955 |